(12) United States Patent
O'Neal

(10) Patent No.: US 6,799,600 B2
(45) Date of Patent: Oct. 5, 2004

(54) PROTECTIVE METAL HOUSING FOR PLASTIC AIR ADMITTANCE VALVE

(75) Inventor: Calvin P. O'Neal, Westley Chapel, FL (US)

(73) Assignee: IPS Corporation, Collierville, TN (US)

(*) Notice: Subject to any disclaimer, the term of this patent is extended or adjusted under 35 U.S.C. 154(b) by 188 days.

(21) Appl. No.: 10/162,374

(22) Filed: Jun. 4, 2002

(65) Prior Publication Data

US 2003/0221727 A1 Dec. 4, 2003

(51) Int. Cl.$^7$ .............................................. F16K 27/12
(52) U.S. Cl. ..................................... 137/382; 137/526
(58) Field of Search .............................. 137/337, 382, 137/526

(56) References Cited

U.S. PATENT DOCUMENTS

| | | | | | |
|---|---|---|---|---|---|
| 340,157 | A | * | 4/1886 | Sawyer | 137/377 |
| 628,061 | A | * | 7/1899 | Ayres | 137/377 |
| 721,853 | A | * | 3/1903 | Bauer | 137/377 |
| 735,007 | A | * | 7/1903 | Watson | 137/377 |
| 926,705 | A | * | 6/1909 | Levy et al. | 137/377 |
| 980,810 | A | * | 1/1911 | McDonald | 137/377 |
| 1,001,779 | A | * | 8/1911 | Slack | 137/382 |
| 1,060,345 | A | * | 4/1913 | Lindsay | 137/526 |
| 1,253,930 | A | * | 1/1918 | Briel | 137/377 |
| 1,451,136 | A | * | 4/1923 | Allnutt | 137/526 |
| 1,628,069 | A | * | 5/1927 | Schmidt et al. | 137/526 |
| 1,633,189 | A | * | 6/1927 | Ernest | 137/526 |
| 1,819,827 | A | * | 8/1931 | Thwaits | 137/526 |
| 2,405,241 | A | * | 8/1946 | Smith | 137/526 |
| 3,605,132 | A | * | 9/1971 | Lineback | 137/526 |
| 3,805,826 | A | | 4/1974 | Westerhoff | |
| 4,212,315 | A | * | 7/1980 | Fahl et al. | 137/377 |
| 4,436,107 | A | | 3/1984 | Persson | |
| 4,518,014 | A | * | 5/1985 | McAlpine | 137/526 |
| 4,867,802 | A | * | 9/1989 | Earl | 137/526 |
| 4,998,554 | A | * | 3/1991 | Rogers | 137/526 |
| 5,273,068 | A | | 12/1993 | Duren | |
| 5,316,569 | A | | 5/1994 | Heunermund | |
| 5,725,099 | A | | 3/1998 | Ericson | |
| 5,836,345 | A | | 11/1998 | Ericson | |
| 5,918,619 | A | | 7/1999 | Woods et al. | |
| 5,957,157 | A | * | 9/1999 | Mitchell et al. | 137/382 |
| 5,971,014 | A | | 10/1999 | Duren | |
| 6,234,198 | B1 | * | 5/2001 | Chalich | 137/526 |
| 6,397,882 | B1 | * | 6/2002 | Anderson | 137/382 |

FOREIGN PATENT DOCUMENTS

| | | |
|---|---|---|
| DE | 100 12 893 A1 | 3/2000 |
| GB | 2 157 586 A | 10/1985 |

* cited by examiner

Primary Examiner—John Rivell
(74) Attorney, Agent, or Firm—Gauthier & Connors

(57) ABSTRACT

A protective metal housing is disclosed for an air admittance valve having a head and a hollow stem adapted for coupling to a sewer vent pipe. The housing comprises a cylindrical adaptor having a through passage internally configured for connection at one end to the sewer vent pipe, and for connection at an opposite end to the stem of the valve. A cover is structured and dimensioned to coact with the adaptor in defining an enclosed chamber for containing the head of the valve. The cover is removably secured to the adaptor and has inlet openings arranged to admit ambient air into the enclosed chamber.

7 Claims, 3 Drawing Sheets

PROTECTIVE METAL HOUSING FOR PLASTIC AIR ADMITTANCE VALVE

BACKGROUND OF THE INVENTION

1. Field of the Invention

This invention relates to a protective metal housing for enclosing a plastic air admittance valve of the type described in U.S. Pat. No. 4,535,807, the disclosure of which is herein incorporated by reference.

2. Description of the Prior Art

Plastic air admittance valves of the type referred to above are widely employed as vent terminals in the sewer vent lines of private dwellings and similar sized buildings. However, the installation of such valves in large commercial building, e.g., multi-dwelling housing complexes, commercial high rise buildings, etc., has been largely restricted by building codes that prohibit the use of exposed plastic components in plumbing systems, including the vent lines associated with such systems.

SUMMARY OF THE INVENTION

The objective of the present invention is to enclose the plastic air admittance valves in specially configured protective metal housings, thus satisfying commercial code restrictions, without in any way compromising the function of the valves as efficient vacuum breakers.

In accordance with a preferred embodiment of the invention, the protective housing includes a cylindrical adaptor and a cover. The adaptor has a through passage internally threaded for connection at one end to a sewer vent pipe or the like, and for connection at the opposite end to an externally threaded stem projecting downwardly from the vacuum breaker valve head. The cover is structured and dimensioned to coact with the adaptor in defining an enclosed chamber for containing the valve head.

The cover is removably secured to the adaptor, and is provided with inlet openings arranged to expose the valve head to ambient air.

These and other features and advantages of the present invention will now be described in greater detail with reference to the accompanying drawings, wherein:

DETAILED DESCRIPTION OF PREFERRED EMBODIMENT

Figure 1:
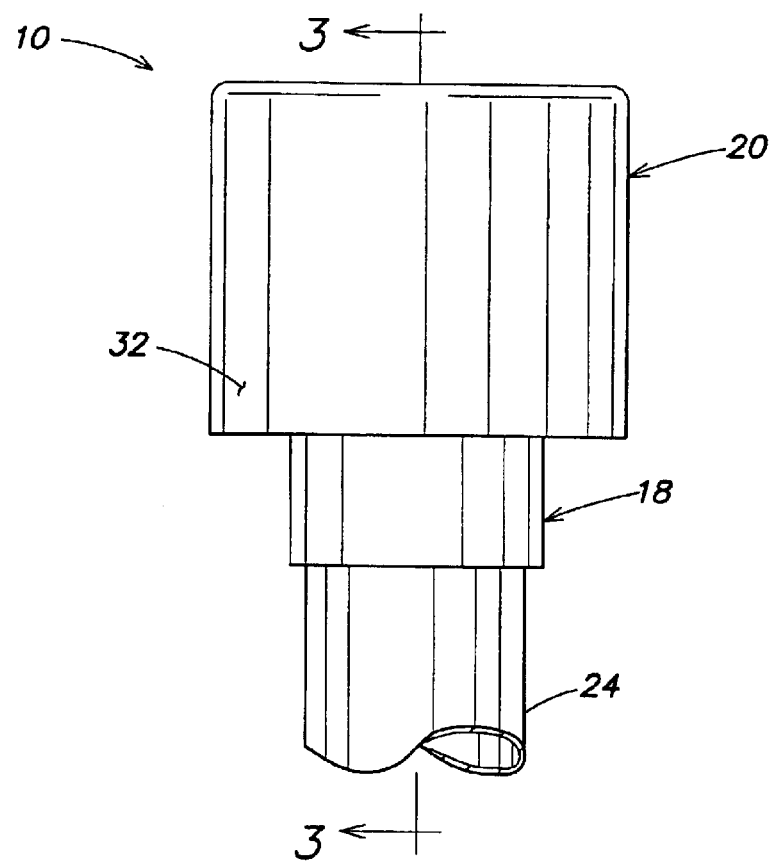
FIG. 1 is a side view of a protective housing in accordance with a preferred embodiment of the present invention, shown mounted on a vent pipe.

In accordance with the present invention, a protective metal housing generally depicted at 10 encloses an air admittance valve 12 of the type referred to above. The valve has an enlarged head 14 and a reduced diameter externally threaded hollow stem 16.

The housing is a two part assembly comprising a cylindrical adaptor 18 and a cover 20. The adaptor has a through passage 22 internally threaded for connection at one end to a sewer vent pipe 24, and for connection at the opposite end to the valve stem 16. The adaptor is preferably provided with an external annular flange 26.

Figure 2:
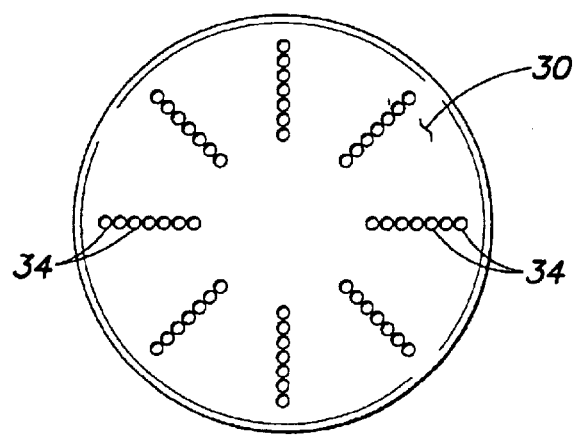
FIG. 2 is a top plan view of the housing.
Figure 3:
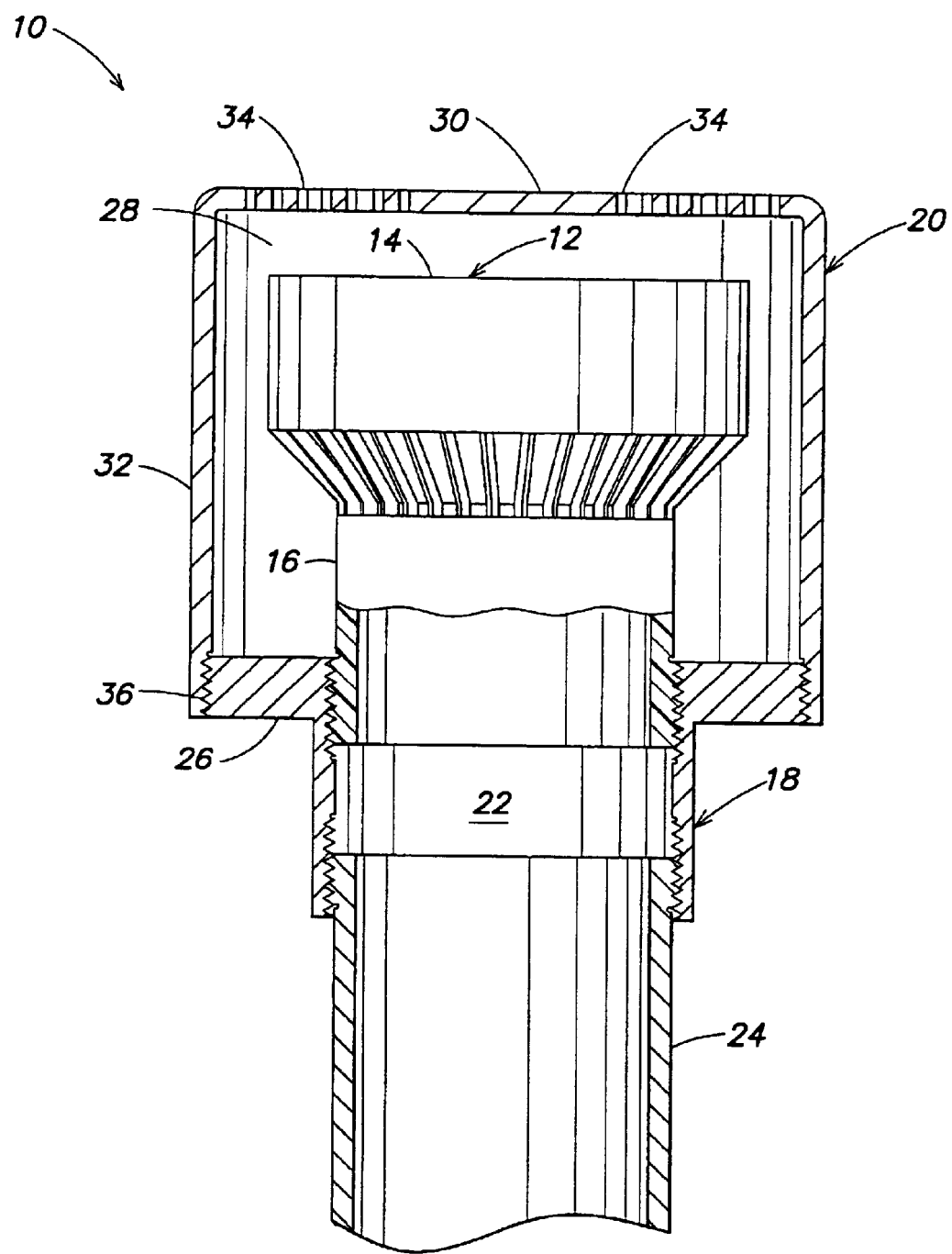
FIG. 3 is a sectional view of an enlarged scale taken along line 3—3 of FIG. 1.
Figure 4:
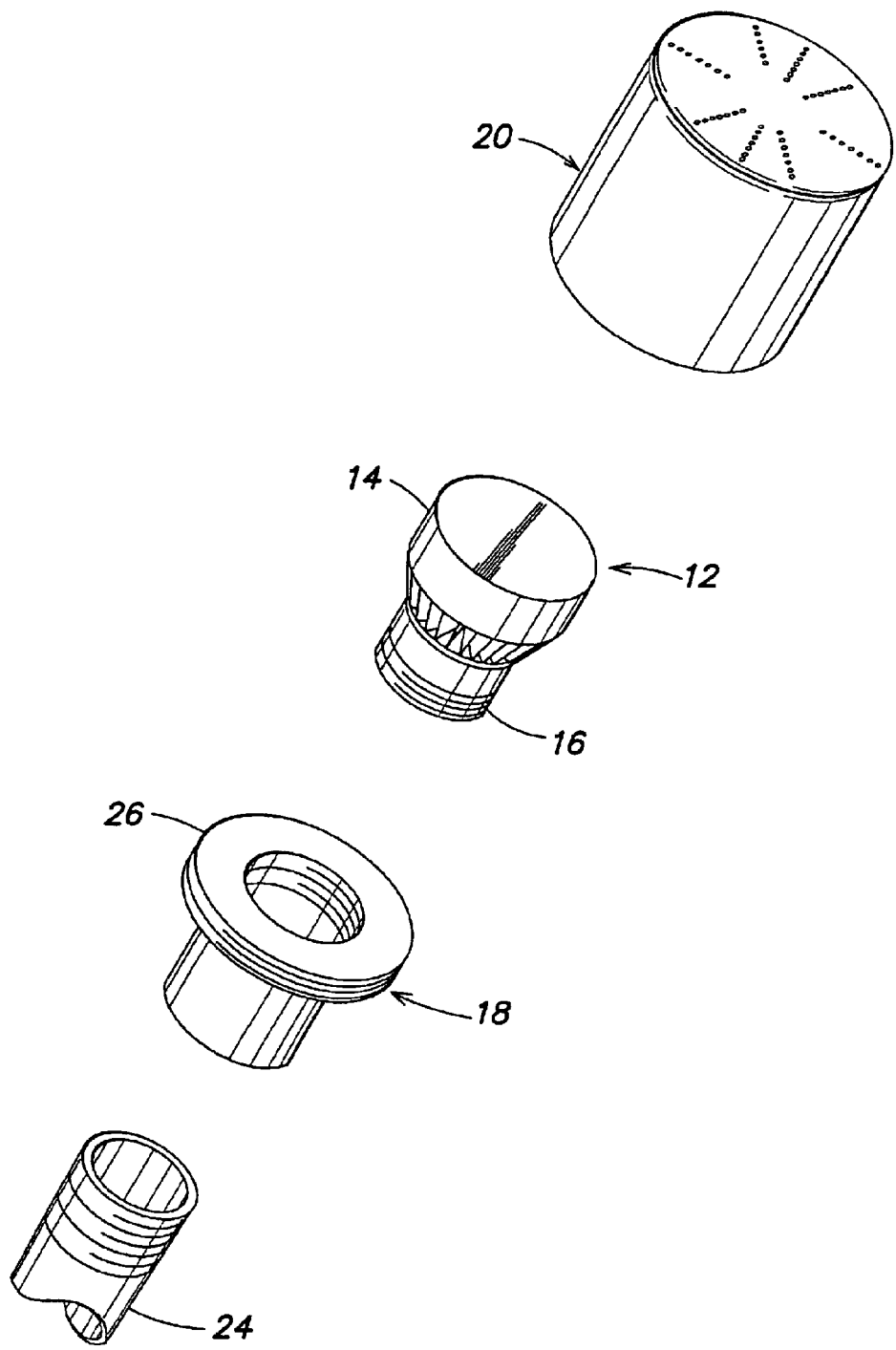
FIG. 4 is an exploded perspective view of the vent valve and protective housing components.

The cover 20 is structured and dimensioned to coact with the adaptor 18 in defining an enclosed chamber 28 for containing the valve head 14. To this end, the cover is generally cup-shaped with a circular top wall 30 and a cylindrical side wall 32. Openings 34 in the top wall 30 admit ambient air into the chamber 28. Preferably, as can be best seen in FIG. 2, the openings 34 are arranged in rows extending radially from the center of the top wall.

The cover is removably secured to the adaptor, preferably as at 36 by internal threads in the side wall 32 in engagement with external threads on the periphery of the annular flange 26. It will be understood, however, that equivalent connecting means may be substituted, including for example screws, a snap interference fit, etc. Both the adaptor 18 and cover 20 are metal components that coact when assembled, to completely enclose and shield the valve 12 from the surrounding environment. The cover is readily removable to afford access to the valve. The openings 34 in the top wall of the cover accommodate an ample supply of ambient air to the valve when it functions in its vacuum-breaking mode.

I claim:

1. A protective metal housing for an air admittance valve having a head and a hollow stem, said stem being adapted for coupling to a sewer vent pipe, said housing comprising:

a cylindrical adaptor having a through passage, said passage being internally configured for connection at one end to said sewer vent pipe, and for connection at an opposite end to the stem of said valve;

a cover structured and dimensioned to coact with said adaptor in defining an enclosed chamber for containing the head of said valve, said cover having inlet openings arranged to admit ambient air into said chamber; and connecting means for removably securing said cover to said adaptor.

2. The housing of claim 1 wherein said adaptor includes an external annular flange, and wherein said cover coacts with said flange to define said chamber.

3. The housing of claim 1 or 2 wherein said cover is cup-shaped with a circular top wall and a cylindrical side wall.

4. The housing of claim 3 wherein said inlet openings are in said top wall.

5. The housing of claim 4 wherein said openings are arranged in rows extending radially from the center of said top wall.

6. The housing of claim 2 wherein said cover is cup-shaped with a circular top and a cylindrical side wall surrounding the external annular flange on said adaptor.

7. The housing of claim 6 wherein said connecting means comprises inter-engaged inner and outer threads provided respectively on the interior of said cover side wall and the periphery of said annular flange.

* * * * *